March 21, 1933. D. A. BRENNAN Re. 18,770
FASTENER
Original Filed April 24, 1929
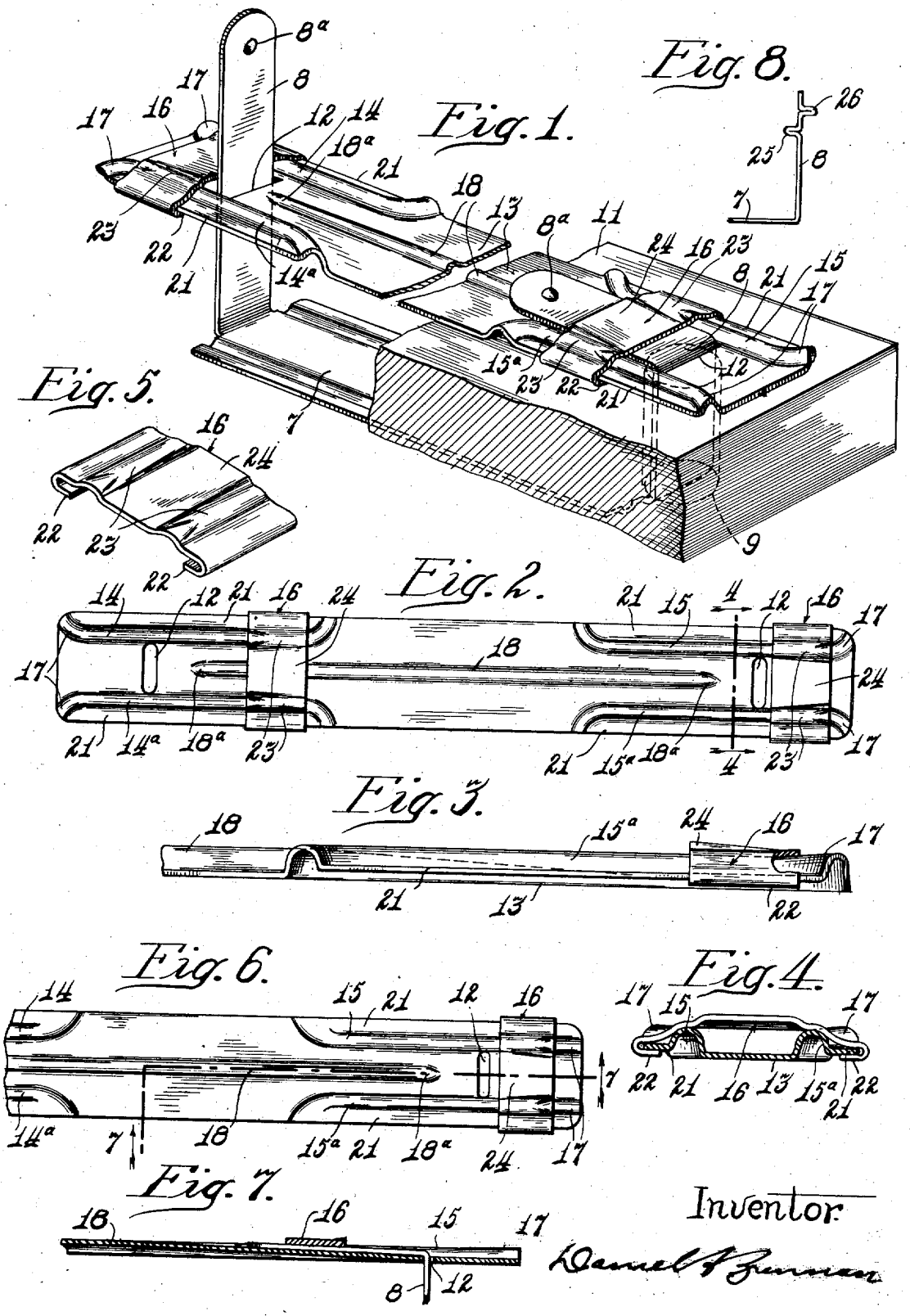
Inventor
Daniel A. Brennan Reissued Mar. 21, 1933

Re. 18,770

UNITED STATES PATENT OFFICE

DANIEL A. BRENNAN, OF CHICAGO, ILLINOIS

FASTENER

Original No. 1,771,728, dated July 29, 1930, Serial No. 357,825, filed April 24, 1929, and in Canada March 19, 1929. Application for reissue filed May 23, 1932. Serial No. 613,126.

The invention relates broadly to fasteners, and more particularly to a new and improved fastener for binding papers together, such as letters in a file, the fastener including a base having spaced tongues at its ends adapted to extend through apertures in the papers and through similarly spaced perforations in a keeper and bent down inwardly and clamped to said keeper.

An object of the invention is to provide an improved fastener simpler and quicker to manipulate and more positive in binding than prior structures.

Another object is to provide an improved fastener with novel means for clamping its tongues to the keeper.

A further object is to provide novel means for holding the locks outwardly and clear of the perforations when the keeper is detached from the tongues.

Another object is to provide novel means for simultaneously bending the tongues toward and centering them on the keeper, and subsequently clamping them thereto.

A further object is to provide novel means for limiting the inward travel of locks, slidably mounted on the keeper, and for frictionally holding said locks, irrespective of to what extent the tongues overlie the keeper.

Another object is to provide elevated guides for the locks to slide on and still maintain a bearing surface extending the entire length of the keeper for engagement with the papers as well as reinforcing means extending to the extreme ends.

Other objects and advantages will become more apparent as the description proceeds, with reference to the illustrations on the accompanying drawing, in which:

Fig. 1 is a perspective view of a fastener embodying the features of the invention, illustrated in its application to file papers.

Fig. 2 is a top plan view of the keeper.

Fig. 3 is a fragmental side elevation of one end of the keeper with part of the lock broken away.

Fig. 4 is a transverse section taken along line 4—4 of Fig. 2.

Fig. 5 is a perspective view of one of the locks.

Fig. 6 is a fragmental plan view of a modified form of keeper.

Fig. 7 is a longitudinal sectional view taken on line 7—7 of Fig. 6.

Fig. 8 is a fragmental view of a modified form of tongue.

Paper fasteners of the type comprising a base with spaced tongues adapted to pass through apertures in papers, and a keeper with registering apertures adapted to receive the tongues, in some instances are provided with locks for sliding over the tongues, after the latter are bent flat on the keeper. In such devices, the locks, however, are usually arranged to slide only between the apertures, and no means is provided for retaining the locks in position from which they can be moved directly over the tongues to clamp the latter in place. Consequently, either or both of the locks frequently must first be adjusted before they can be slid over the tongues, thereby resulting in inconvenience and waste of time.

In devices where the locks are movable outwardly on the keeper beyond the perforations from which position they are movable over the bent tongues, no means is provided for retaining the locks in position, and hence they are movable freely over substantially the entire length of the keeper. Hence, the keeper may be placed inadvertently on the base with the locks out of functioning position, as for example between the perforations, thereby necessitating removal and replacement of the keeper.

Thus, in both these prior forms, mis-adjustment of the locks is possible and common. Furthermore, no means is provided for confining the locks over the tongues after the parts have been assembled and locked, and no secure clamping engagement is obtained.

The present invention, like my co-pending U. S. applications Ser. No. 432,800, filed Mar. 3, 1930; and Ser. No. 476,058, filed Aug. 18, 1930, and Canadian application filed Mar. 19, 1929, and refiled May 13, 1932, Ser. No. 389,435, has as its aim, the provision of a new and improved paper fastener that is not subject to the foregoing objections and disadvantages.

Referring to Fig. 1 of the drawing, the fastener constituting the preferred embodiment of the invention comprises a base 7 provided on its ends with spaced tongues 8 adapted to pass through similarly spaced perforations 9 (only one shown) in file papers 11. Preferably, the tongues 8 are substantially less in width than the body of the base, and are struck up substantially at right angles thereto. Each tongue also preferably is formed with a projection 8*a* adjacent its free end, for a purpose that will hereinafter appear.

The base 7 normally is positioned to lie flush against the bottom of the papers 11, and a keeper 13, formed with perforations or slits 12 in opposite ends for receiving the tongues 8, is adapted to be placed against the top of the papers. Preferably the keeper is formed from a thin stiff material.

Provided on opposite ends of the keeper 13 are two sets of generally longitudinal, parallel raised guides or tracks 14—14*a* and 15—15*a*, respectively. Preferably these tracks are in the form of ribs produced by upsetting the metal of the keeper.

The tracks serve to reinforce the ends of the keeper against bending, and also to confine the tongues 8 laterally when the latter are bent over toward each other against the keeper 13. The tracks are slightly spaced laterally from the side margins of the keeper, and these margins, for a distance co-extensive with the tracks, are raised or elevated from the plane of the keeper to constitute guides or retaining flanges 21 of the tracks, the inner ends terminate short of the center of the keeper, and the outer ends extend beyond the perforations 12 and preferably to the outer ends of the keeper.

Slidably disposed on the tracks at opposite ends of the keeper 13 are two locks 16, respectively. Preferably each lock 16 is formed from a strip of metal extending transversely of the tracks and formed with spaced up-set ribs 23 slidably co-acting with the tracks. The ends of the locks 16 are bent downwardly and then under the guides 21 to constitute flanges 22 for retaining the locks on the keeper. Preferably, the guides 21 are elevated sufficiently to cause the flanges 22 to clear the top of the papers 11.

The inner and outer ends of the tracks are curved laterally, preferably outwardly, to the side margins of the keeper 13, so as to constitute end abutments for the locks 16, limiting the movement of the latter along the keeper to the region of the tracks. The outer ends of the tracks however, extend parallel for a substantial distance beyond the perforations 12 to permit the locks 16 to be moved outwardly beyond the perforations. Preferably, the locks 16 are slightly depressed over the flanges 21. It will be evident that the edges of the locks when moved against the curved ends of the tracks will have a slight wedging or binding engagement therewith. This engagement will serve to hold the locks in either extreme position of adjustment, thereby preventing misadjustment. Preferably, the outer ends 17 of the tracks also are formed with a gradual upward taper, and ribs 23 on the locks 16 are formed with outer end flares over the tracks adapted to effect a binding engagement with the raised ends for holding the locks outwardly of the perforations 12 when the keeper is being attached to the base.

The keeper 13 is formed with a longitudinal rib 18 spaced between the companion tracks, and terminating short of the perforations 12, to provide reinforcing. The rib 18 also co-operates with the locks 16 to clamp the tongues in place, and to this end, its ends 18*a* preferably taper gradually downwardly toward the perforations to improve their wedging co-operation with the locks to hold the tongues securely in place.

The locks 16 may be flared inwardly and upwardly with respect to the keeper, as indicated at 24, and the side walls of said flares, may diverge from the longitudinal axis. The flares provide means for facilitating the bending of the tongues 8 from vertical position to a position flat against the keeper 13, and the diverging sides of the flares serve to center the tongues with respect to the tracks thus properly positioning them for clamping engagement with the ends 18*a* of the rib. Thus, the rib 18 and the locks 16 co-operate to effect a tight clamp for the tongues not readily displaced. The projections 8*a* serve to limit or resist the inward movement of the locks 16 when the tongues overlap the keeper for but a short distance, as may be the case when the file of papers 11 is relatively thick, and preferably also effect a frictional engagement with the locks to hold the latter in clamping position. Within the broad concept of the invention, the projections 8*a* may be effective to restrain or frictionally retard the movement of the locks 16 relative thereto.

The modified form of invention shown in Figs. 6 and 7 differ from the preferred form only in that the ends of its companion tracks 14—14*a* and 15—15*a* are not curved.

The modified form of tongue illustrated in Fig. 8 differs from that shown in Fig. 1, in that it has projections 25 and 26 on opposite sides, the projection 26 to engage the lock 16 and the projection 25 to co-operate with the keeper instead of with the rib 18.

The fastener, as described, is provided with means for frictionally binding the locks on the keeper outwardly of the perforations while the keeper is detached, and upon attachment of the base, by sliding the locks inwardly, the tongues are simultaneously forced down flat thereon due to the fact that the ends of the keeper are outwardly of, but very close to the perforations. Due to the fact that the tracks extend outward of the apertures to the extreme ends of the keeper a bearing surface of proper stiffness is provided over the entire length of the keeper. Also the central rib is provided to co-operate with the locks to wedge the tongues to the keeper. Means also is provided on the tongues to prevent the locks sliding off the ends thereof irrespective of the position of the ends of the tongues relative to the perforations.

I claim:

1. A paper fastener having, in combination, a base formed with two tongues, one at each end, said tongues being less in width than said base and each of said tongues having a small projection struck outwardly adjacent its free end, a keeper substantially co-extensive in width with said base, and having spaced transverse perforations for said tongues to pass through, companion tracks, spaced to receive said tongues therebetween, arranged in pairs extending inwardly from the ends and stopping short of the medial portion of said keeper, all of the ends of said tracks curving outwardly to provide positive stops, the outer ends of said tracks gradually increasing in height toward the outer ends, guides formed along the longitudinal edges of the keeper co-extensive with said tracks and elevated from the plane of the bottom of the keeper, a longitudinal rib struck up therein, but of less height than said companion tracks, tapering downwardly at both ends toward and adjacent said apertures, two locks one slidably mounted over each pair of tracks, and having its ends bent under said guides, said locks being arranged to bend the tongues downwardly into the space between the tracks while being slid inwardly, said locks also being flared inwardly and upwardly, said flares diverging from the longitudinal axis to provide tongue aligning means, and said locks also having upturned portions on the outer edges overlying each track to facilitate their wedging to the outer ends of the tracks.

2. A keeper for paper fasteners, having perforations adjacent its ends, a rib on the longitudinal axis extending short of said perforations, companion tracks arranged in pairs extending from the ends of said keeper inwardly a short distance, all of the ends of said tracks curving outwardly to provide positive stops, the outer ends of said tracks gradually sloping upwardly toward the adjacent end of the keeper, horizontal flanges providing elevated guides formed along the longitudinal edges of the keeper co-extensive with said tracks, and two locks, one slidably mounted over each pair of companion tracks, the ends of the locks being bent under the lateral edges of said elevated guides, with the lower faces of said ends elevated from the plane of the bottom face of the keeper.

3. A keeper for paper fasteners, having perforations adjacent its ends, a rib on the longitudinal axis, its ends being spaced from said perforations, companion tracks arranged in pairs extending inwardly from the ends of said keeper and stopping short of its medial portion, all of the ends of said tracks curving outwardly to provide positive stops, the longitudinal ends of said tracks gradually sloping upwardly toward the adjacent ends of said keeper, horizontal flanges providing elevated guides formed along the longitudinal edges of the keeper co-extensive with said tracks, and two locks, one slidably mounted over each pair of companion tracks, the ends of said locks being bent under the lateral edges of said elevated guides, said bent over portions being disposed entirely above the plane of the bottom face of the keeper, the locks being slightly flared over each of said tracks to facilitate wedging thereon outwardly of and clear of said perforations.

4. A paper fastener comprising a base having spaced tongues, and a keeper having similarly spaced perforations for said tongues to pass through, a rib on the longitudinal axis extending short of said perforations, companion tracks arranged in pairs extending inwardly from the ends of said keeper, all of the ends of said tracks curving outwardly to provide positive stops, the ends of said tracks outward of said perforations gradually sloping upwardly toward the adjacent ends of said keeper, elevated guides formed along the longitudinal edges of the keeper co-extensive with said tracks, and a lock slidably mounted over each pair of companion tracks adapted to bend the tongues, when the latter are passed through the perforations, into the space between the tracks and wedge said tongues to said rib, the ends of said locks being bent under the lateral edges of said elevated guides, said bent over portions being disposed entirely above the plane of the bottom face of the keeper.

5. A paper fastener comprising a base having spaced tongues, and a keeper having similarly spaced perforations for said tongues to pass through, a rib on the longitudinal axis extending short of and tapering toward said perforations, companion tracks arranged in pairs extending inwardly from the ends of said keeper, all of the ends of said tracks curving outwardly to provide stops for locks, the outer ends of said tracks gradually sloping upwardly toward the adjacent end of said keeper, elevated guides formed along the longitudinal edges of the keeper co-extensive with said tracks, and a lock slidably mounted over each pair of companion tracks adapted to bend the tongues down when the tongues are passed through the perforations into the space between the tracks, the locks being formed with means for gradually centering the tongues between the tracks and wedging them to said rib, the ends of said locks being bent under the lateral edges of said elevated guides, said bent over portions being disposed entirely above the plane of the bottom face of the keeper.

6. A fastener adapted to bind a plurality of papers together comprising, in combination, a base having spaced tongues and a projection adjacent the free end of each tongue adapted to provide a stop when many papers are bound, and a keeper adapted to bear on said papers over its entire length, having spaced perforations for said tongues to pass through, a rib on the longitudinal axis extending short of and tapering toward said perforations, two pairs of tracks one pair formed at each end of said keeper, all of the ends of said tracks being provided with stops, the outer ends of said tracks gradually sloping upwardly toward the adjacent ends of said keeper, elevated guides formed along the longitudinal edges of the keeper co-extensive with said tracks, and locks one slidably mounted over each pair of tracks adapted to bend the tongues when the latter are passed through the perforations into the space between said tracks to wedge said tongues to said rib, the ends of said locks being bent under the lateral edges of said elevated guides, said bent under portions being disposed entirely above the plane of the bottom face of the keeper.

7. A keeper for paper fasteners having, perforations adjacent its ends, stops outwardly of said perforations, companion tracks arranged in pairs extending inwardly from the ends, a longitudinal rib extending between said tracks, elevated guides co-extensive with said tracks formed on the edges of the keeper, and a lock mounted for sliding over each pair of tracks, the ends of the locks extending under the guides.

8. A keeper for paper fasteners having, perforations adjacent its ends, companion tracks extending inwardly from the ends, stops on the outer ends of said tracks, a longitudinal rib spaced from said tracks and tapering toward said perforations, elevated guides co-extensive with the tracks formed on the edges of the keeper, and a lock mounted for sliding over said tracks, the ends of the locks extending under the guides.

9. A fastener having, in combination, a base provided with spaced tongues, and a keeper having similarly spaced perforations for said tongues to pass through, stops outwardly of said perforations, companion tracks arranged in pairs extending inwardly from the ends of said keeper, a central longitudinal rib between said perforations, elevated guides formed on the edges of the keeper, and locks mounted for sliding on said guides, arranged to bend said tongues into clamping engagement with said rib.

10. A fastener having, in combination, a base provided with spaced tongues, stops on said tongues, and a keeper having similarly spaced perforations for said tongues to pass through, stops outwardly of said perforations and locks slidable on said keeper between said stops.

11. A fastener comprising, in combination, a keeper having spaced apertures, a base having spaced tongues adapted to be inserted through said apertures and bent over said keeper, stops formed on the free ends of said tongues, and locks slidably secured to said keeper for movement from beyond said apertures inwardly over said tongues, said stops limiting the inward movement of said locks.

12. A fastener comprising, in combination, a flat elongated keeper having spaced apertures one in each end, a flat elongated base having spaced tongues one on each end, said tongues being adapted to be inserted through said apertures and then bent inwardly toward each other against said keeper, and two locks on said keeper movable respectively from opposite ends of said keeper beyond said apertures inwardly over said tongues, said locks being formed with an upwardly and inwardly flared offset portion aligned with said tongues and adapted to deflect said tongues inwardly against said keeper upon inward movement of said locks.

13. A fastener comprising, in combination, a flat elongated keeper having spaced apertures one in each end, a flat elongated base having spaced tongues one on each end, said tongues being adapted to be inserted through said apertures and then bent inwardly toward each other against said keeper, two pairs of parallel longitudinal tracks one pair formed in each end of said keeper, the tracks of each pair extending along opposite sides of said keeper, the ends of each track being gradually curved laterally to constitute stops, and two locks on said keeper one movable along each pair of tracks between said stops and past the adjacent aperture, the selective engagement between said locks and said stops being a binding engagement tending to retain said locks against said stops.

14. A fastener comprising, in combination, a flat elongated keeper having spaced apertures one in each end, a flat elongated base having spaced tongues one on each end, said tongues being adapted to be inserted through said apertures and then bent inwardly toward each other against said keeper, two pairs of parallel longitudinal tracks one pair formed in each end of said keeper, the tracks of each pair extending along opposite sides of said keeper, the outer end of each track from a point beyond the adjacent aperture being flared upwardly to constitute an end stop, and two locks on said keeper one movable along each pair of tracks past the adjacent aperture and adapted to be moved into binding engagement with the adjacent stops.

15. A fastener comprising, in combination, a flat elongated keeper having spaced apertures one in each end, a flat elongated base having spaced tongues one on each end, said tongues being adapted to be inserted through said apertures and then bent inwardly toward each other against said keeper, two pairs of parallel longitudinal tracks one pair formed in each end of said keeper, the tracks of each pair extending along opposite sides of said keeper, the outer end of each track being curved outwardly gradually to the adjacent end corner of said keeper and being flared upwardly to constitute an end stop, and two locks on said keeper one movable along each pair of tracks past the adjacent aperture and against the adjacent stop.

16. A fastener comprising, in combination, a flat elongated keeper having spaced apertures one in each end, a flat elongated base having spaced tongues one on each end, said tongues being adapted to be inserted through said apertures and then bent inwardly toward each other against said keeper, two pairs of parallel tracks one pair formed in each end of said keeper, the tracks of each pair extending longitudinally of said keeper and at opposite sides of said apertures and said tongues, a central longitudinal rib formed in said keeper between the tracks of each pair and terminating short of said apertures, the ends of said rib being tapered to said keeper, and two locks on said keeper movable respectively from opposite ends of said keeper beyond said apertures inwardly over said tongues to confine the latter against the ends of said rib and between said tracks.

17. A fastener comprising, in combination, a flat elongated keeper having spaced apertures one in each end, a flat elongated base having spaced tongues one on each end, said tongues being adapted to be inserted through said apertures and then bent inwardly toward each other against said keeper, two pairs of parallel tracks one pair formed in each end of said keeper, the tracks of each pair extending longitudinally of said keeper and at opposite sides of said apertures and said tongues, a central longitudinal rib formed in said keeper between the tracks of each pair and terminating short of said apertures, the ends of said rib being tapered to said keeper, and two locks on said keeper movable respectively from opposite ends of said keeper beyond said apertures inwardly over said tongues to confine the latter against the ends of said rib and between said tracks, each of said locks having a portion between the underlying tracks flared upwardly and inwardly.

18. A fastener comprising, in combination, a flat elongated keeper having spaced apertures one in each end, a flat elongated base having spaced tongues one on each end, said tongues being adapted to be inserted through said apertures and then bent inwardly toward each other against the keeper, two pairs of parallel tracks one pair formed in each end of said keeper, the tracks of each pair extending longitudinally of said keeper and at opposite sides of said apertures and said tongues, a central longitudinal rib formed in said keeper between the tracks of each pair and terminating short of said apertures, the ends of said rib being tapered to said keeper, and two locks on said keeper movable respectively from opposite ends of said keeper beyond said apertures inwardly over said tongues to confine the latter against the ends of said rib and between said tracks, each of said locks having a portion between the underlying tracks flared upwardly and inwardly, and stops for said locks formed on the free end of said tongues.

19. A fastener comprising, in combination, a flat elongated keeper having spaced apertures one in each end, a flat elongated base having spaced tongues one on each end, said tongues being adapted to be inserted through said apertures and then bent inwardly toward each other against said keeper, a central longitudinal rib formed in said keeper and terminating short of said apertures, and two locks one on each end of said keeper movable from beyond said apertures inwardly over said tongues to secure the latter against the ends of said rib.

20. A fastener comprising, in combination, a flat elongated keeper having spaced apertures one in each end, a flat elongated base having spaced tongues one on each end, said tongues being adapted to be inserted through said apertures and then bent inwardly toward each other against said keeper, longitudinal tracks formed in said keeper along its margins, and a central longitudinal rib formed in said keeper between said apertures, and two locks movable on said keeper outwardly beyond said apertures, and inwardly over said tongues to confine the latter to said keeper between said tracks.

21. In a fastener, a keeper comprising a flat elongated member formed with parallel side tracks, a longitudinal intermediate rib, an aperture at one end of said rib, and between said tracks, and a lock on said member movable along said tracks past said aperture, the outer ends of said tracks being curved to form stops for said locks.

22. An article of the class described having, in combination, a keeper provided with perforations adjacent its ends, relatively short diverging longitudinal runways formed in said keeper at both sides of said perforations, and locks slidably mounted on said runways arranged to slide outwardly over and clear of said perforations and to bind thereto after passing over said perforations.

23. A keeper for fasteners having perforations adjacent its ends, relatively short longitudinal runways formed in the keeper at both sides of, and extending inwardly and outwardly beyond said perforations, said runways being flared to provide stops, and locks on said runways arranged for sliding between said stops.

24. A keeper for fasteners having a perforation adjacent each end, relatively short longitudinal companion runways formed in the keeper, at both sides of each perforation and extending inwardly and outwardly beyond said perforations, said runways being flared to form stops, and locks arranged to slide between said stops, one of said locks being provided to pass beyond each of said perforations.

25. A fastener having, in combination, a base provided with tongues, a keeper having transverse apertures spaced to receive said tongues, longitudinal companion runways at opposite sides of the apertures extending inwardly from the ends of the keeper a short distance beyond said apertures, said runways being flared, and a lock mounted on each of said companion runways for sliding over said perforations and limited in travel by said flares.

26. A fastener having, in combination, a base provided with a tongue at each end adapted to be bent upwardly to substantial parallelism, a keeper having apertures spaced to receive said tongues, locks mounted on said keeper outwardly of said apertures adapted to slide over and force said tongues downwardly, and means on the keeper for limiting the travel of said locks.

27. A fastener comprising, in combination, a flat elongated base provided with two longitudinally spaced tongues adapted to be bent upwardly into substantial parallelism, projections on the free ends of said tongues, a flat elongated keeper having two longitudinally spaced apertures for said tongues to pass through, said tongues being adapted to be bent downwardly against the top of said keeper, and two locks slidably mounted on said keeper for movement respectively over the downwardly bent portions of said tongues to retain the latter against said keeper, each of said locks being movable into binding engagement with the projection on the underlying tongue.

28. A fastener comprising, in combination, a flat elongated base provided with two longitudinally spaced tongues adapted to be bent upwardly into substantial parallelism, projections on the free ends of said tongues, a flat elongated keeper having two longitudinally spaced apertures for said ends of said tongues to pass through, said apertures being of such form and size that said projections can pass therethrough with said tongues, said tongues being adapted to be bent downwardly toward each other against the top of said keeper, and two locks mounted on said keeper outwardly of said apertures and slidable therefrom inwardly respectively over the downwardly bent portions of said tongues to retain the latter against said keeper, each of said locks having means movable onto the projection on the underlying tongue for binding engagement therewith.

29. A fastener comprising, in combination, a flat elongated base provided with two longitudinally spaced tongues adapted to be bent upwardly into substantial parallelism, raised projections on the free ends of said tongues, a flat elongated keeper having two longitudinally spaced apertures for said ends of said tongues to pass through, said apertures being of such form and size that said projections can also pass therethrough, said tongues being adapted to be bent downwardly toward each other against the top of said keeper, two locks slidably mounted on said keeper for movement respectively over the downwardly bent portions of said tongues to retain the latter against said keeper, each of said locks having means movable into frictional engagement with the projection on the underlying tongue, and stops on said keeper outwardly of said apertures for preventing movement of said locks off of said keeper.

30. A fastener comprising, in combination, a flat elongated base provided with two longitudinally spaced tongues adapted to be bent upwardly into substantial parallelism, projections on the free ends of said tongues, each projection being a fold extending traversely of the associated tongue, a flat elongated keeper having two longitudinally spaced apertures for said tongues to pass through, said apertures being of a form and size to receive said tongues with said projections, said tongues being adapted to be bent downwardly against the top of said keeper, and two locks slidably mounted on said keeper for movement respectively over the downwardly bent portions of said tongues to retain the latter against said keeper, each of said locks being movable into binding engagement with the projection on the underlying tongue.

In testimony whereof I affix my signature.

DANIEL A. BRENNAN.